United States Patent [19]

Dhuey

[11] Patent Number: 5,768,602
[45] Date of Patent: Jun. 16, 1998

[54] SLEEP MODE CONTROLLER FOR POWER MANAGEMENT

[75] Inventor: Michael J. Dhuey, Cupertino, Calif.

[73] Assignee: Apple Computer, Inc., Cupertino, Calif.

[21] Appl. No.: 511,158

[22] Filed: Aug. 4, 1995

[51] Int. Cl.[6] ................................................. G06F 15/16
[52] U.S. Cl. .............................. 395/750.04; 395/750.07; 395/556
[58] Field of Search ........................ 395/750, 733, 395/555, 556; 375/750.04, 750.07

[56] References Cited

U.S. PATENT DOCUMENTS

| | | | |
|---|---|---|---|
| 5,511,203 | 4/1996 | Wiser et al. | 395/750 |
| 5,560,017 | 9/1996 | Barrett et al. | 395/733 |

Primary Examiner—Ayaz R. Sheikh
Assistant Examiner—Jeffrey K. Seto
Attorney, Agent, or Firm—Sawyer & Associates

[57] ABSTRACT

A sleep mode controller, useful for an electronic device such as a computer, can supply multiple clocks with appropriate synchronization and which is capable of dynamic speed switching. The device provides clock signals at various speeds and relationships which can in turn be used to support various functions of the electronic device. The sleep mode controller can be activated and smoothly transition various clock signals from one time domain to a second time domain, each of which has predetermined speeds and clock-signal relationships. Dynamic speed switching is used to reset timing (bus and processor clock) sensitive elements such that computer machine speed (bus and processor clock frequencies) can be changed dynamically without interruption of I/O services or general OS and application level functions.

4 Claims, 5 Drawing Sheets

Power Manager Idle Time Execution

SLEEP MODE CONTROLLER FOR POWER MANAGEMENT

FIELD OF THE INVENTION

The invention relates to speed switching hardware that can slow down an electronic system (typically to save energy) or to restore the system to full speed. More particularly, the invention relates to controlling the operating speed of a computer system which is capable of operating in a high speed mode and a low speed mode, and coordinating a transition from one speed to the other smoothly so the system can operate without need for resetting the system.

BACKGROUND OF THE INVENTION

There are many reasons to conserve power in modern electronic devices. Many people are increasingly aware that power is a limited resource and it is advantageous to save power whenever possible. Power management has become an important issue for designers of many electronic devices. This is particularly true for computer systems, but is also useful for devices such as televisions, monitors, stereos and other audio/visual equipment, facsimile machines, telephone answering machines, and the like.

In many instances, such as a facsimile machine or telephone answering machine, very little system activity is required while waiting for a condition of interest, such as a ringing telephone. In a similar way, a computer which is connected to a network may require very little activity while monitoring network traffic, watching for a call to that specific computer. Once the condition of interest (a telephone call or a network call) is detected, the system generally needs additional resources to execute the procedure appropriate for the condition of interest, such as demodulating and processing a facsimile transmission, or providing some sort of file response, e.g. reading or writing a requested file.

In some systems, notably portable devices, the available power is limited and it is advantageous to save every possible milliwatt. This will preserve battery life as much as possible. In other systems, which may be powered by line current, various components of the system consume varying amounts of power. In the example of a computer, there may be a monitor, a hard drive, a CPU, and other ASICs, each of which consume power. To control heat build-up inside a computer housing, it is common to include a fan, which consumes still more power. Taken together, the system may consume more power than is desirable on a long term basis.

Many modern systems implement some form of energy saving procedure, such as turning down or turning off any component which can be safely modified without affecting system performance. One option would be to turn down or turn off any components which are not being used. For example, many computer monitors can respond to a variety of commands to, for example, first reduce the brightness of the display, then, ultimately, effectively turn off the display, yet holding the display in a state that can quickly be restored to normal operating conditions. Screen savers are quite common on modern personal computers. One form of screen saver dims the image on a monitor after some preset period of time or upon activation by a command. This reduces the amount of power consumed by the monitor. One useful program for dimming a monitor screen after a preset time is the Energy Saver control panel from Apple Computer (Cupertino, Calif.), available with Apple's System Software 7.5. Other components may be shut down as well. For example, the CPU Energy Saver control panel (from Apple Computer) can be used to turn off a computer after a preset time. This program is specifically designed to work with Apple computers which include soft power on/off, but one skilled in the art could design a similar system for other systems with appropriate hardware capabilities. Portable computers, such as Apple Computer's 520, 520c or 540c, often include software that will monitor hard disk activity and spin down the hard disk after a preset period of inactivity, thereby saving energy.

Another way of saving power is to run a system at slower clock speeds. A computer running at 25 MHz will consume less power than the same computer running at 33, 50, or 66 MHz. In general, however, users prefer to run their computers as fast as possible in order to run more powerful programs or to compute results more quickly. However, when a computer is simply standing by and not actively in use, very few users mind if the computer is in a low power state or runs much more slowly.

One alternative might be to control the speed of the computer so as to run the computer at relatively low speed whenever possible and at higher, usually maximum, speed whenever needed. If the computer is a self-contained or independent system so that all system timings need be maintained constant only relative to various components within the system, this can work well. Even within a computer, several components have timing constraints which may differ. For example, dynamic RAM (DRAM) needs to be refreshed within certain time constraints. A processor (CPU) may be capable of operating at one or more speeds. System bus management may require servicing requests within certain time constraints. Managing system resources such as dynamic RAM may include sensitive timing constraints. Software requests may require some timing constraints, particularly when dealing with time-sensitive events such as real-time sampling or most I/O which involves audio or video. A user will quickly notice if an audio CD does not play back smoothly or if a video recording or playback has timing glitches. Each of these different timing constraints need to be coordinated. The situation becomes even more complicated when the computer is connected to external devices, e.g. a network connection, that cannot or will not change speed synchronously with the computer.

External devices of particular interest include network services such as AppleTalk™ or EtherNet and communication services such as telephone and facsimile, which might be monitored using GeoPort™. It would be advantageous if the computer of interest could monitor these services to detect any signal directed or addressed to the computer, then transition smoothly to a higher, usually full, speed state to service the signal and capture or respond to any attendant communication. One such example would be to monitor a telephone line while in a low power state. If an incoming call is detected, the system could transition to a normal speed state to activate call-responsive services such as answering the telephone, monitoring for facsimile or data modem signals or voice, provide an appropriate response, such as receiving, storing and printing a facsimile or capturing and logging a voice message. Once the communication has been handled, the computer system can remain in the high speed state for a pre-selected period of time, then return to the low speed state.

Another example of a communication is responding to a network services request. A computer may be connected to a network but be needed only for infrequent communication. One such example might be a user's computer which is turned on, but has remained idle for some time-out period, perhaps 15 minutes. The user may be away from her desk but desire to log onto her computer. By using another computer connected to the network, the second computer can send to the primary computer a request for servicing, namely a request for attention to be followed by or integrated with a log in request. The primary computer can remain in a low power state until a network packet addressed to that computer is detected. At that point, the computer can transition to a normal speed state to service the request more effectively.

The speed transition is generally difficult for traditional computers. For example, a portable computer such as a PowerBook might be connected to an EtherNet network. If the portable is capable of going to a slow, low-powered state ("sleep mode") but is not capable of dynamic speed switching, the transition between speeds can be problematic. A typical portable has a preferred system operating speed, e.g. 33 MHz. The relationship of the system operating speed to the speed of another service such as servicing EtherNet packets is generally at a fixed ratio. This ratio will have one value for the slow system operating speed, and a different ratio for the normal system operating speed.

Solutions used in the past provide some benefit but do not go as far as the present invention. Older portable computers, notably older Macintosh PowerBook products, used an "economode" in which the computer could be run at a different speed (frequency) after restarting the machine. The available speeds are generally "hard-coded" into such machines. Newer portable computers, notably newer Macintosh PowerBook products, utilize a technique called "processor cycling" to dynamically change the speed of the processor, thereby reducing power consumption. Some processor cycling implementations actually turn the processor on and off rapidly enough to effect a "slower" CPU speed. When processor cycling, the machine's processor will resume full power operation upon any external interrupt. However, certain types of interrupts may not warrant full power operation. For example, if a floppy disk needs to be ejected, there may be no need to resume full power operation of, for example, the monitor or in some cases even the hard disk.

Since the second service is operating in a single time domain, the computer should transition smoothly between its differing operating speeds. This includes identifying and coordinating any system clock edges. A typical modern computer system may have a primary system clock speed but may have additional internal clocks in various relationships with the system clock. For example, many computer systems include one or more industry standard buses, such as PCI, which operate at a defined frequency (33 MHz for PCI). The system bus connecting the computer's primary CPU to major resources such as memory and a bus bridge to the standard bus typically will operate at a different frequency. Certain processors such as the PowerPC™ 601 or 601+ from IBM/Motorola require various secondary clocks at multiples of the system clock. Heretofore, changing system operating speeds has required a system reset or other major system transition in order to avoid introducing glitches such as timing errors which can potentially crash a system or cause data error problems. The recent development of dynamic speed switching hardware provides a means for smoothly transitioning between system operating speeds while maintaining services.

SUMMARY OF THE INVENTION

The present invention, useful for an electronic device such as a computer, provides a device which can supply multiple clocks with appropriate synchronization and which is capable of dynamic speed switching. The device provides clock signals at various speeds and relationships which can in turn be used to support various functions of the electronic device. Dynamic speed switching is used to reset timing (bus and processor clock) sensitive elements such that computer machine speed (bus and processor clock frequencies) can be changed dynamically without interruption of I/O services or general OS and application level functions. The sleep mode controller can be activated and smoothly transition various clock signals from one time domain to a second time domain, each of which has predetermined speeds and clock-signal relationships.

The invention includes providing a voltage controlled oscillator (VCO) which can be selectively adjusted to one of a range of operating frequencies. This is combined using various summing functions and parameter inputs to deliver several different clock signals in fixed phase and timing relationship to each other. These clock signals may change in overall speed, duty cycle and in relation to each other according to the clock speed selection and also according to the setting for "doze" mode (on or off).

One object of this invention is to provide a device to support dynamic speed switching for an electronic device, preferably including a computer.

This and other objects and advantages of the invention, as well as the details of an illustrative embodiment, will be more fully understood from the following specification and drawings.

DETAILED DESCRIPTION OF THE INVENTION

One preferred implementation of the sleep mode controller device of this invention is in a computer system which includes dynamic speed switching hardware capabilities.

Figure 1:
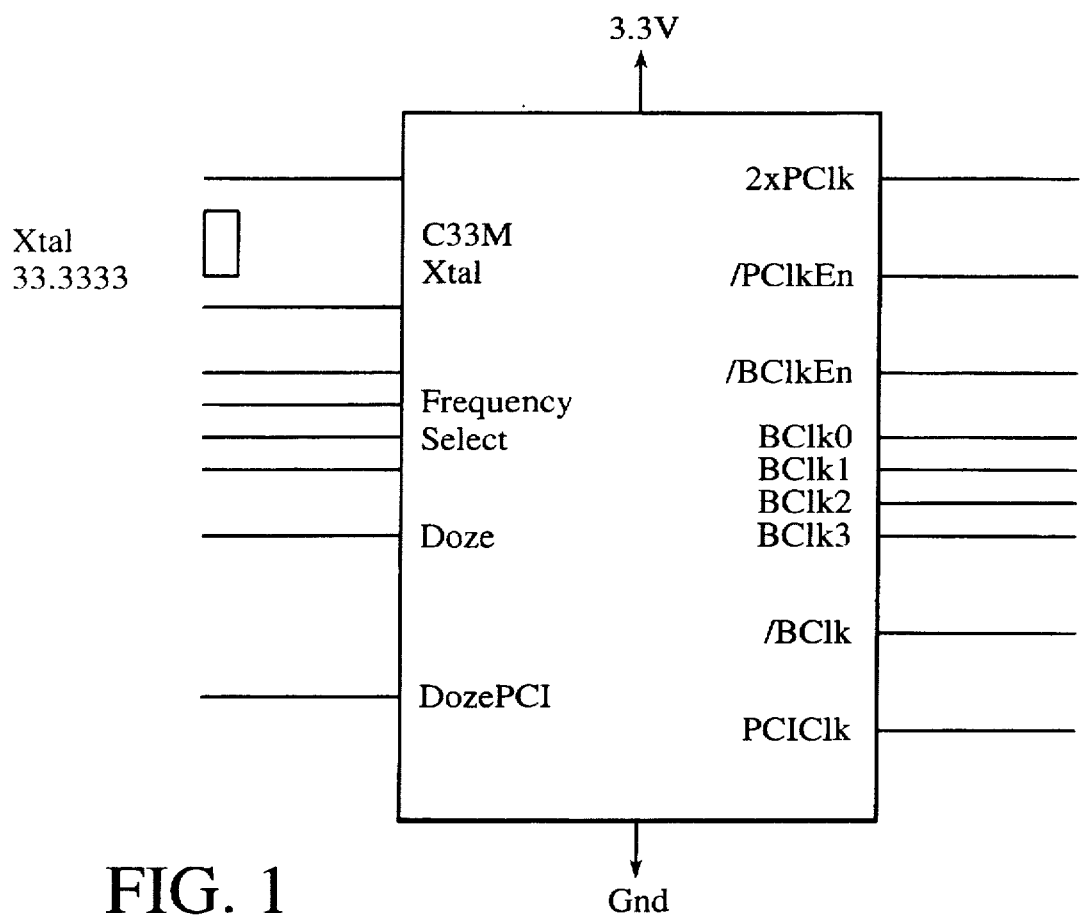
FIG. 1 illustrates the major logical functions of a hardware controller useful in practicing this invention.
Figure 5:
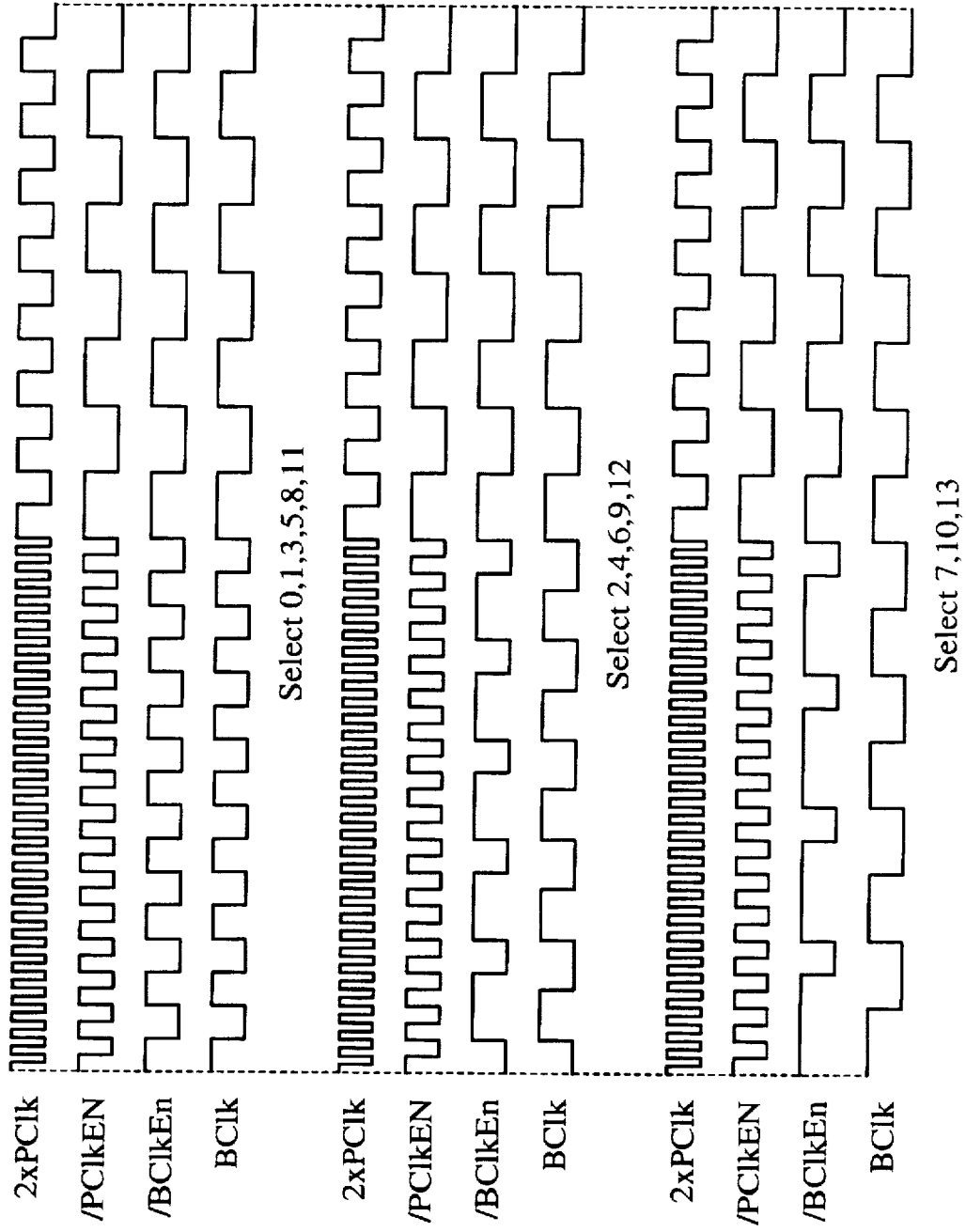
FIG. 5 illustrates the relationship of the waveforms of FIG. 4 during normal operation, at the point of transition to doze mode, and during doze mode.
Figure 6:
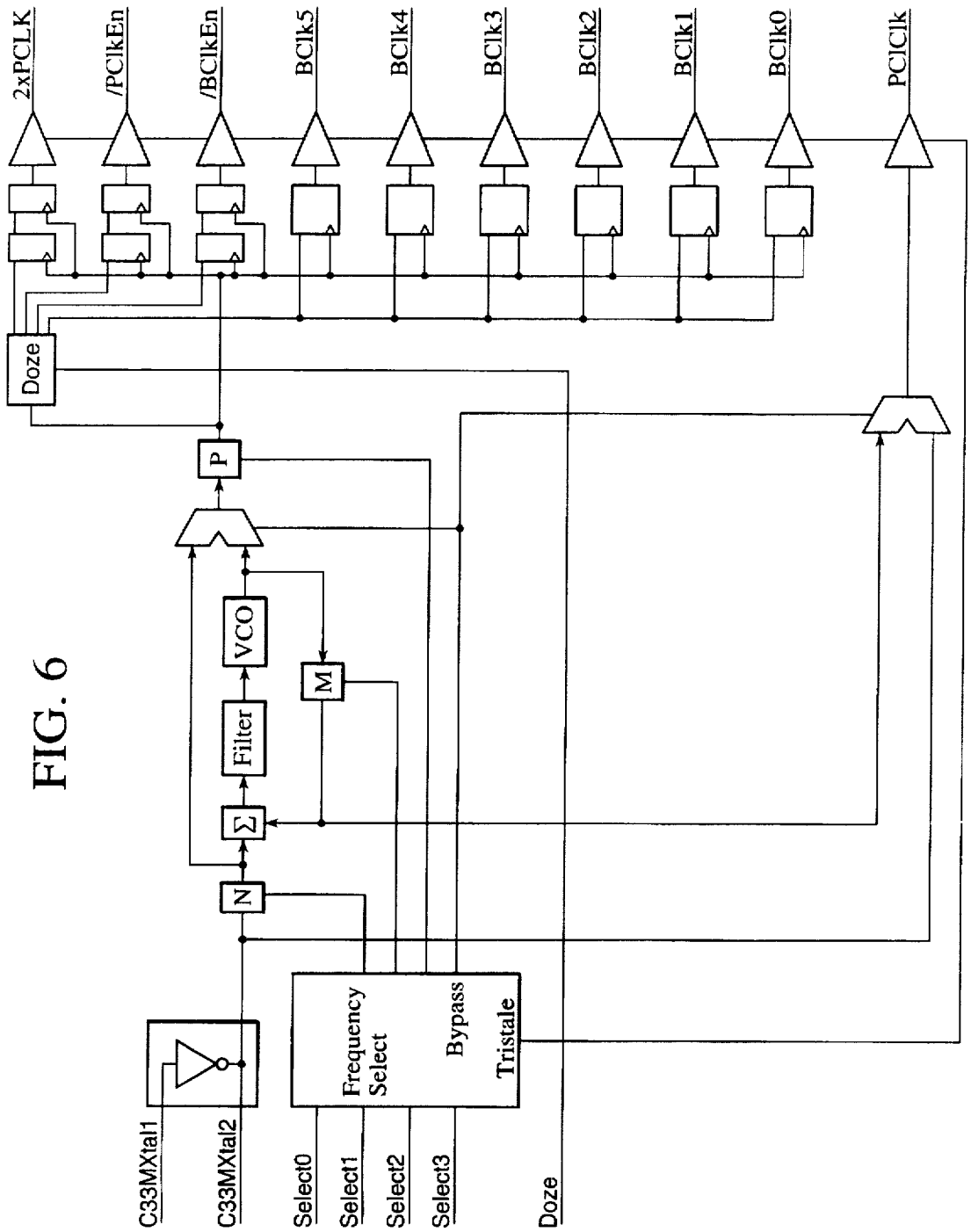
FIG. 6 illustrates internal circuitry of a preferred embodiment of the present invention.

Although a variety of hardware can be used with this dynamic speed switching, one preferred embodiment of hardware useful as an adjunct in practicing the present invention is illustrated in FIG. 1. The circuitry of a preferred embodiment of the chip is illustrated in FIG. 6, together with timing diagrams for different combinations of select modes and parameters during normal operation and showing the transition from normal operation to doze mode in FIGS. 4 and 5.

The device of this invention works best with a CPU that is a static part. A static part can be clocked at "any" speed, at least within a wide range of speeds. Some CPUs include one or more phase locked loops and thus must operate at a preset frequency. Such processors are not well suited for use with the dynamic speed switching provided by this new device.

Figure 4:
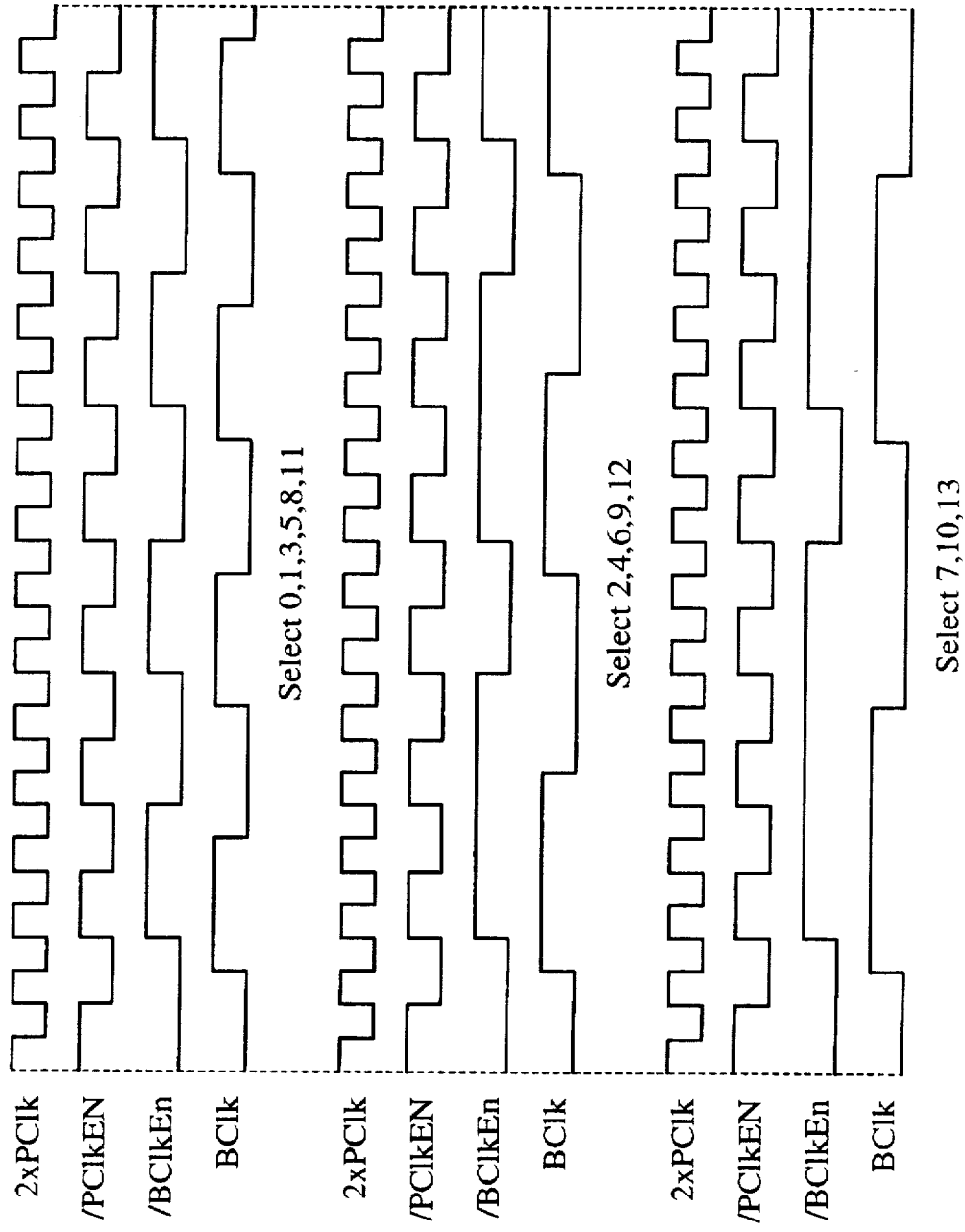
FIG. 4 illustrates the relationship of several waveforms during normal operation of a computer under a variety of clocking schemes.

The present device uses a crystal, 33 MHz in a preferred embodiment, to deliver a variety of clock signals. Referring to Table 1 and FIG. 6, different modes can be selected which will mix certain parameters to deliver clock signals in varying relationships. Typical waveforms are illustrated in FIG. 4. Some details of each of the clock signals and some of the relationships of the clock signals are detailed in Table 2, below. When instructed to enter "doze" mode, the clock signals are modified, again according to preset relationships. See FIG. 5, illustrating various clock signals during normal operation, then a transition to doze mode. The clock signals are coordinated and synchronized to provide a smooth transition. Software, such as that described below, manages the transition so that applications, I/O and other functions are maintained before and after the transition.

The mode of the sleep mode controller can be read by the system CPU, either directly or through other support chips. For example, a bus controller might be used to actually generate and control the various selection and doze mode control signals to the sleep mode controller.

The selection of specific modes and clock signals may need to accommodate certain system requirements. For example, a system which includes PCI bus connectivity may need to maintain a clock signal for the PCI bus, since the PCI specification does not provide for a reduced speed mode.

The hardware device shown in FIG. 1 features: PowerPC™ 601 clocks; fully integrated PLL; single crystal value for all output frequencies (33.3333 MHz); output frequency up to 300 MHz; ±150 ps maximum PPC 601 cycle-to-cycle jitter; 350 ps maximum PPC 601 output-to output skew; doze mode for reduced power (Energy Star); delay to PPC 601 clocks vs. BClks; BClk+2, 3, 4 of PClk; PClk 66.66, 80, 100, 120, 133.33, 150 MHz; PCI clock (33.3333 MHz); 3.3V Vcc; and a 32 pin PQFP package.

In this preferred embodiment, a functional definition of output frequencies includes:

C33MXtal=33.3333 MHz (100 ppm)

VCO=C33MXtal * M/N

2xPClk=VCO÷(( P * 2) *(If (Doze) Then 4 Else 1))

/PClkEn=2xPClk÷2

/BClkEn=/PClkEn÷( If ( Doze ) Then 1 Else B)

BClk=/BClkEn

PClClk =C33M

* Note: M, N, P, and B are selected from the Table of 601 output frequencies below as a set.

TABLE 1

Output frequencies

| Select | M | N | VCO (MHz) | P | 2xPCLK (MHz) | 2xPCLK Doze (MHz) | /PClkEn (MHz) | B | /BClkEn BClkx (MHz) | /PClkEn /BClkEn BClkx Doze (MHz) |
|---|---|---|---|---|---|---|---|---|---|---|
| 0 | 16 | 1 | 533.33 | 2 | 133.33 | 33.33 | 66.66 | 2 | 33.33 | 16.66 |
| 1 | 48 | 5 | 320 | 1 | 160 | 40 | 80 | 2 | 40.00 | 20.00 |
| 2 | 48 | 5 | 320 | 1 | 160 | 40 | 80 | 3 | 26.67 | 20.00 |
| 3 | 24 | 2 | 400 | 1 | 200 | 50 | 100 | 2 | 50.00 | 25.00 |
| 4 | 24 | 2 | 400 | 1 | 200 | 50 | 100 | 3 | 33.33 | 25.00 |
| 5 | 72 | 5 | 480 | 1 | 240 | 60 | 120 | 2 | 60.00 | 30.00 |
| 6 | 72 | 5 | 480 | 1 | 240 | 60 | 120 | 3 | 40.00 | 30.00 |
| 7 | 72 | 5 | 480 | 1 | 240 | 60 | 120 | 4 | 30.00 | 30.00 |
| 8 | 16 | 1 | 533.33 | 1 | 266.66 | 66.66 | 133.33 | 2 | 66.67 | 33.33 |
| 9 | 16 | 1 | 533.33 | 1 | 266.66 | 66.66 | 133.33 | 3 | 44.44 | 33.33 |
| 10 | 16 | 1 | 533.33 | 1 | 266.66 | 66.66 | 133.33 | 4 | 33.33 | 33.33 |
| 11 | 18 | 1 | 600 | 1 | 300 | 75 | 150 | 2 | 75.00 | 37.50 |
| 12 | 18 | 1 | 600 | 1 | 300 | 75 | 150 | 3 | 50.00 | 37.50 |
| 13 | 18 | 1 | 600 | 1 | 300 | 75 | 150 | 4 | 37.50 | 37.50 |
| 14 | — | — | — | — | — | — | — | — | — | — |
| 15 | — | — | — | — | — | — | — | — | — | — |

*Note: Select 14 is BYPASS mode and Select 15 tristates the outputs for TRISTATE mode.

Some PCI card makers depend on the system to provide a clock, for example to keep the card and PCI signaling synchronized.

When the doze mode is entered the 2xPClk and /PClkEn clocks are reduced by a factor of 4, the /BClkEn matches the /PClkEn . Doze mode is a glitchless change in the clock waveforms. The doze signal should be sampled at the VCO frequency to synchronize the transition to and from doze mode for 2x_PClk, /PClkEn, /BClkEn, BCLKx, /BCLK.

Sparky output frequencies shows an example of a VCO constrained to run between 300 MHz and 1 GHz. The implementation is free to choose other VCO frequencies so long as the select lines cause the appropriate outputs and the 2xPClk is divided from the VCO. Alternate embodiments may use a lower speed VCO. A limited frequency version allows the maximum 2xPCLKEN frequency to be 120 MHz. Otherwise all other specifications need to be met.

TABLE 2

Pin Descriptions

| Name | Input/ Output | Description |
|---|---|---|
| 2xPClk | Output | Two times Processor Clock is a high frequency (up to 300 MHz) output which clocks the PPC 601. This signal is delayed one half 2xPClk period relative to the BClkx signals. The rising edge is used to sample inputs to PPC 601 except /PClkEn and /BClkEn which are sampled on the falling edge. The duty cycle for this signal is always 50% but the frequency varies depending on the setting of the select bits and the Doze pin. |

TABLE 2-continued

Pin Descriptions

| Name | Input/Output | Description |
|---|---|---|
| /BClkEn | Output | Bus Clock Enable. An active low signal which is sampled by the falling edge of 2xPClk. This signal is delayed one half 2xPClk period relative to the BClkx signals. when /PClkEn and /BClkEn are sampled low at the falling edge of 2xPClk the next rising edge of 2xPClk is the input and or output reference clock for the PPC 601 bus. The duty cycle of this signal varies depending on the setting of the select bits and the Doze pin. |
| /PClkEn | Output | Processor Clock Enable. An active low signal which is sampled by the falling edge of 2xPClk. This signal is delayed one half 2xPClk period relative to the BClkx signals. When /PClkEn is sampled low at the falling edge of 2xPClk the next rising edge will advance the processor clock. The duty cycle for this signal is always 50% but the frequency varies depending on the setting of the select bits and the Doze pin. |
| BClk0–BClk5 | Output | Bus Clock. This is the bus clock signal repeated on 6 pins. The rising edge coincides with the rising 2xPClk edge which follows a falling 2xPClk edge with /PClkEn and /BClkEn low. The duty cycle for this signal is always 50% but the frequency varies depending on the setting of the select bits and the Doze pin. |
| C33MXtal1–C22MXtal2 | Input | 33.3333 MHz Crystal input pins. The crystal is series resonant fundamental mode A-T cut. It has a shunt capacitance of 5 pF max, an equivalent series resistance of 50 ohms, and a correlation drive level of 100 μW. If a TTL level signal is used it drives C33MXtal1. |
| Doze | Input | An active high input which reduces the 2xPClk, /PClkEn, /BClkEn, and BClk0–BClk5 signal frequency as shown in the Sparky Output Frequencies table. This signal is sampled by 2xPClk and causes the glitchless transitions show in the Doze mode transition waveforms. |
| PCIClk | Output | A 33.3333 MHz output intended for the PCI bus clock. The frequency can be reduced by the DozePCI signal to 16.6666 MHz. |
| Select0–Select3 | Input | Select is a four bit value which selects the output frequencies for 2xPClk, /PClkEn, /BClkEn, and BClk0–BClk5. Select3 is the high order bit such that select3=1 select2=0 select1=1 select0=0 is line 10 in the Sparky Output Frequencies table (133.33 MHz /PClkEn). |

TABLE 3

Signal Descriptions

| | |
|---|---|
| Fvco | The internal VCO frequency is implementation specific. This specification represents a range of VCO frequencies that could be used to implement the Sparky output frequencies. In a preferred embodiment, this is ranges from 300 to 1000 MHz. |
| Fc33m | This is the 33.3333 MHz crystal frequency which drives the table of Sparky output frequencies. A different frequency could be used but that is outside the definition of this part. The functional definition of frequencies shows how the substitution of 33.3333 MHz would produce a new set of frequencies. The design of the VCO may limit the range of frequencies which could be used and the exact specification of this frequency allows the smallest possible range. In a preferred embodiment, this is ranges from 20 to 40 MHz. |
| Fout2xP | This is the maximum frequency of the 2xPClk output. A lower limit is allowed if the part is so marked as a reduced frequency version for cost savings. In a preferred embodiment, this has a maximum of 300 MHz. |
| FoutP | This is the maximum frequency of the /PClkEn output. A lower limit is allowed if the part is so marked as a reduced frequency version for cost savings. In a preferred embodiment, this has a maximum of 150 MHz. |
| FoutB | This is the maximum frequency of the /BClkEn output. A lower limit is allowed if the part is so marked as a reduced frequency version for cost savings. In a preferred embodiment, this has a maximum of 75 MHz. |

Figure 2:
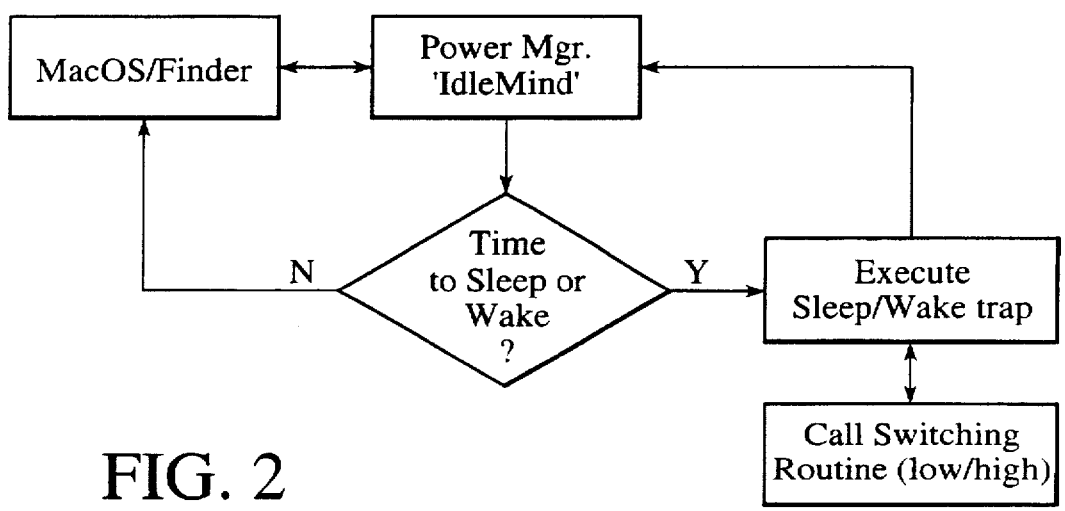
FIG. 2 illustrates power manager idle time execution.
Figure 3:
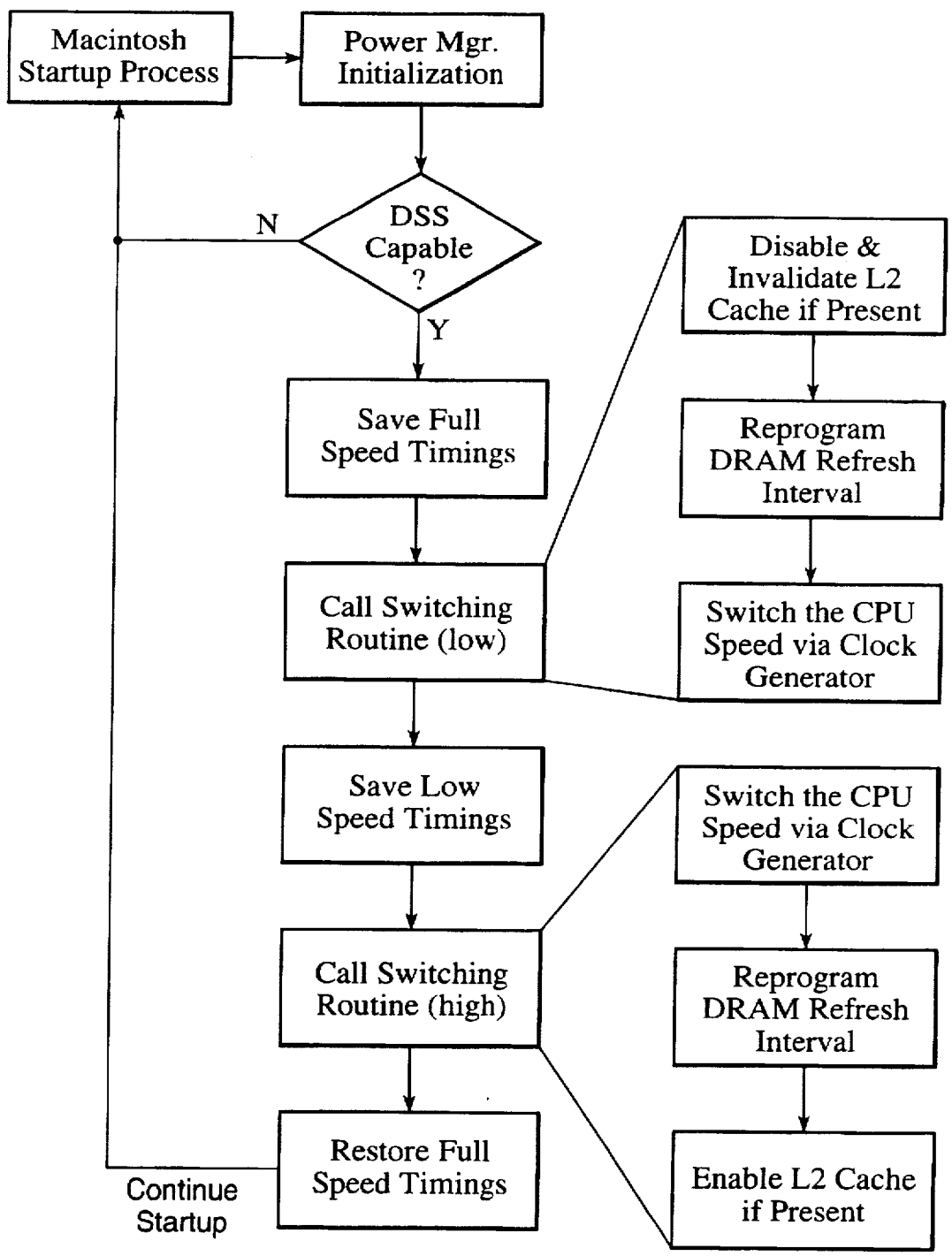
FIG. 3 illustrates startup code execution, which can be performed during machine boot.

The hardware device can be controlled in a variety of ways. One preferred method of control involves software, a driver named Power Manager. The main events of the Power Manager are illustrated in FIGS. 2 and 3. The related hardware capabilities could be implemented in a variety of ways by one skilled in the art. One preferred hardware implementation uses the "Sparky" chip in the Macintosh 7200.

Referring to FIG. 3, Power Manager initialization is executed during computer startup or booting. Part of this initialization involves checking the particular hardware features of the host computer. If the machine supports dynamic speed switching, the following sequence of events takes place:

1. The initial full speed timing constants for TimeDBRA, TimeSCC, TimeVIA and TimeSCSI are saved in Power Manager low memory globals.
2. The speed switching routine specific to the host computer executes, reducing the processor and computer system bus (e.g. ARBus in a Macintosh 7200) clock frequencies. This switching routine is illustrated in FIG. 2. The switching routine includes copying the full speed timing constants into memory where the constants can be maintained at least while the computer is turned on without resetting or rebooting.
3. The same timing constants are recalculated for this new speed.
4. The low speed (doze mode) constants are saved in Power Manager low memory.
5. The speed switching routine is called to switch back to full speed operation.
6. The full speed timing constants previously saved in Power Manager low memory globals are copied into general low memory.
7. The "boot" process continues.

TimeDBRA is a low memory constant that provides a means of consistent measure of time across machines of different speed. The value is computed based on the speed of the host machine and can be used by software as a timing value.

TimeSCSI is a low memory constant that indicates the delay in accessing SCSI controller registers, the SCSI FIFO queues, etc. It is used primarily in polled SCSI transactions.

TimeVIA is a low memory constant that indicates the delay in accessing VIA ASIC registers. It is used to indicate a known quantity of time.

TimeSCC is a low memory constant that indicates the delay in accessing SCC (serial) ASIC registers. It is used to indicate a known quantity of time.

If at any time during operation of the computer an event occurs to drive the machine into a low power state (e.g. auto sleep is invoked by the Power Manager, perhaps by passage of time without significant activity; the user selects a 'sleep' command, e.g. from a Macintosh Finder "Special" menu; or a call is made to the private Power Manager dispatch trap), the following sequence of events take place. Referring to FIG. 2, 1. The machine-specific speed switching routine is called to drive the speed of the machine low for doze or idle operation.
2. The appropriate time constants (calculated and saved during startup) are copied from the Power Manager globals to general low memory.
3. Any queues of pending events with timing sensitivity are examined for possible speed-switch impacts. In particular, the AppleTalk transition queue is traversed, notifying each procedure in the queue that a speed change has occurred and the network timing dependencies should be recalculated using the new timing constants in low memory (essentially re-execute the calibration done at startup/opening of network services using traditional, well known AppleTalk protocols).

Most timing-sensitive elements of the operating system recalculate any timing sensitive information before each transaction. Therefore, by changing the timing constants in low memory, components such as SCC, SCSI and floppy drive recalibrate correctly upon the next transaction involving that device. In a Macintosh computer, AppleTalk is the primary, and perhaps only, component that should be explicitly told to recalibrate.

The events described above in reference to FIG. 2 are repeated when the device is driven to its full speed operational mode. The Power Manager operates a state change notification queue. Operating System level and Application level software can install routines in this queue and obtain a notification message when the speed of the device has changed dynamically. This message can be used to recalibrate any timing-specific code on which the notified software may depend.

The event loop for detecting a need for a speed switch can be managed in a variety of ways well known to one skilled in the art. One method for managing the event loop is to include a test instruction in an operating system main event loop that tests the condition "time to sleep or wake" on a periodic basis. Another potential monitor is interrupt driven, particularly when in the doze or idle state, is to provide a combinatorial event monitor that can monitor the status of one or more conditions and upon any of the conditions changing state to a trigger status, the combination of inputs will signal "time to sleep or wake" and initiate the event loop. In the preferred implementation, the Power Manager patches the SynchIdleTime call and runs it's 'IdleMind' code every third call to this routine. The resulting effect is that the Power Manager is tied into the OS event loop.

Also in a preferred implementation, the Power Manager not only checks for "time to wake or sleep" but also for pending sleep/wake events from device controlling software (drivers). A driver can post an event to which the Power Manager will respond accordingly the next time through the IdleMind code (see FIG. 2).

During a speed change, certain system settings need to be adjusted. Referring again to FIG. 3, but noting that these steps are part of the Speed Switching Routine in FIG. 2, during a Call Switching Routine to a low speed, 1. If a level 2 (L2) cache is present, the cache is disabled and invalidated.
2. The speed is switched by writing the new frequency value to a register in the memory controller that controls the mode of the clock generation chip ("Sparky" in one preferred implementation—described in more detail below). This chip switches the computer system bus (ARBus in the Macintosh 7200) and processor frequencies without producing a glitch that would 'crash' the computer system.
3. The DRAM refresh interval is reprogrammed to preserve the desired interval at the low clock frequency. In a preferred implementation, the VRAM and ROM timings are also changed. The VRAM refresh is disabled, because the assumption is that the monitor and frame buffer controller are powered down.

Referring again to FIG. 3 and noting FIG. 2, during a Call Switching Routine to a high speed, 1. The full speed mode value is written to the clock generator control register in the memory controller ASIC (e.g. "Sparky").
2. The DRAM refresh interval, together with any changes to VRAM and ROM timings, are restored to the correct value for full speed operation.
3. If a level 2 cache is present, it is enabled.

This speed switching routine is completely dynamic in that it will work with essentially any full and low speed timings as well as with any cache size. The principles could be used to switch to an intermediate speed, if desired for some reason, using the principles described above.

The dynamic speed switching (DSS) code conforms to the Power Manager conventions in that it can be invoked from any computer's primitive table and does not rely on a specific implementation of hardware. Any machine that has the hardware capability to switch speeds dynamically simply sets the appropriate feature bit and includes a hardware specific switching routine. The DSS code can interface as needed with the hardware specific switching routine to initiate any needed operational modes and to store and provide needed information about timings.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

I claim:

1. A sleep mode controller for use with an electronic device capable of dynamic speed switching, the sleep mode controller comprising:

a frequency selector for outputting a parameter;

a frequency selection input connected to the frequency selector;

a clock source;

a combinatorial device connected to the clock source and the frequency selector, the combinatorial device receiving the parameter output by the frequency selector and having an output connected to an output device to drive a first clock signal;

a doze mode controller connectable to the output device to drive the first clock signal such that a frequency of the first clock signal can be modified according to whether the doze mode controller is in normal mode or in doze mode; and an input to the sleep mode controller for setting the mode of the doze mode controller, the sleep mode controller being capable of changing the frequency of the first clock signal directly between a normal frequency when the doze mode controller is in the normal mode and a doze frequency when the doze mode controller is in the doze mode, the doze frequency capable of being less than half of the normal frequency.

2. The sleep mode controller of claim 1 wherein the frequency selector further outputs a plurality of parameters; and wherein the combinatorial device connected to the frequency selector further receives the plurality of output parameters, such that the output of the combinatorial device is modified according to the values of the plurality of parameters.

3. The sleep mode controller of claim 1 further comprising:

a flip flop connected between the output of the combinatorial device and the output device to drive the first clock signal, wherein one input to the flip flop is the output of the combinatorial device and a second input to the flip flop is the output of the doze mode controller and the output of the flip flop is the output device to drive the first clock signal.

4. The sleep mode controller of claim 1 further comprising:

a plurality of output devices, connectable to the doze mode controller and driving a plurality of clock signals such that the doze mode controller sets a first specified timing relationship, duty cycle, and frequency of each of the plurality of clock signals relative to the first clock signal when the doze mode controller is in the normal mode and sets a second specified timing relationship, duty cycle, and frequency of each of the plurality of clock signals relative to the first clock signal when the doze mode controller is in doze mode.

the first specified timing relationship, duty cycle, and frequency of each of the plurality of clock signals being capable of being different from the second specified timing relationship, duty cycle and frequency of each of the plurality of clock signals.

* * * * *